United States Patent
LeGrande et al.

(10) Patent No.: US 7,282,260 B2
(45) Date of Patent: *Oct. 16, 2007

(54) ELECTRICALLY CONDUCTIVE AND ELECTROMAGNETIC RADIATION ABSORPTIVE COATING COMPOSITIONS AND THE LIKE

(75) Inventors: Wayne B. LeGrande, Chesapeake, VA (US); Robert C. Boyd, Richmond, VA (US)

(73) Assignee: Unitech, LLC, Hampton, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/358,375

(22) Filed: Feb. 5, 2003

(65) Prior Publication Data

US 2004/0028859 A1    Feb. 12, 2004

Related U.S. Application Data

(63) Continuation-in-part of application No. 09/151,445, filed on Sep. 11, 1998, and a continuation-in-part of application No. PCT/US02/07039, filed on Mar. 8, 2002, now Pat. No. 6,576,336.

(51) Int. Cl.
  *B32B 5/16* (2006.01)
  *C08K 3/04* (2006.01)
(52) U.S. Cl. .............. 428/323; 428/324; 428/325; 428/403; 428/404; 428/406; 524/495; 524/501; 252/502; 252/506; 252/510
(58) Field of Classification Search ............ 428/323, 428/327, 408, 403, 406, 36.91, 328; 427/372.2, 427/384, 385.5
See application file for complete search history.

(56) References Cited

U.S. PATENT DOCUMENTS

| | | | |
|---|---|---|---|
| 4,452,950 A | 6/1984 | Wideman | 525/339 |
| 4,624,798 A | 11/1986 | Gindrup et al. | 252/62.54 |
| 4,624,865 A | 11/1986 | Gindrup et al. | 427/126.2 |
| 4,818,438 A | 4/1989 | Wiley | 252/511 |
| 4,826,631 A * | 5/1989 | Sullivan | 252/512 |
| 4,889,750 A | 12/1989 | Wiley | 428/34.2 |
| 5,002,826 A | 3/1991 | Pollart et al. | 428/323 |
| 5,286,415 A | 2/1994 | Buckley et al. | 252/502 |
| 5,492,653 A | 2/1996 | Hochheimer et al. | 252/514 |
| 5,585,427 A | 12/1996 | Schimmel et al. | 524/377 |
| 5,744,544 A | 4/1998 | Dunaway et al. | 524/832 |
| 5,756,008 A | 5/1998 | Slutsky et al. | 252/514 |
| 5,786,785 A * | 7/1998 | Gindrup et al. | 342/1 |
| 5,853,877 A * | 12/1998 | Shibuta | 428/357 |
| 5,908,585 A * | 6/1999 | Shibuta | 252/506 |
| 6,440,331 B1* | 8/2002 | Carano et al. | 252/506 |
| 6,576,336 B1* | 6/2003 | LeGrande | 428/327 |

FOREIGN PATENT DOCUMENTS

| EP | 0450701 | 10/1991 |
|---|---|---|
| EP | 0591815 | 4/1994 |
| GB | 718161 | 11/1954 |

OTHER PUBLICATIONS

Spectro Dynamic Systems information sheets.

* cited by examiner

*Primary Examiner*—Monique R. Jackson
(74) *Attorney, Agent, or Firm*—Jacobson Holman PLLC

(57) ABSTRACT

A coating composition having outstanding electrically conductive and electromagnetic radiation absorptive properties is disclosed with a water emulsion polymer binder. The binder is a blend of a first emulsion containing a conjugated diene as monomer or comonomer, and a second emulsion containing an acrylic, aliphatic or aromatic polyurethane, polyester urethane, polyester, epoxy, polyamide, polyimide, vinyl, fluoropolymer, or silicone polymer. An effective amount of electrically conductive and electromagnetic radiation absorptive particles is dispersed in the binder. The particles include a combination of graphite particles, carbon nanotubes and metal containing particles. An effective amount of water is also present.

27 Claims, No Drawings

ELECTRICALLY CONDUCTIVE AND ELECTROMAGNETIC RADIATION ABSORPTIVE COATING COMPOSITIONS AND THE LIKE

RELATED APPLICATIONS

This application is a continuation-in-part of U.S. application Ser. No. 09/151,445, filed Sep. 11, 1998, now U.S. Pat. No. 6,576,336 and International application PCT/US02/07039, filed Mar. 8, 2002.

BACKGROUND OF THE INVENTION

1. Field of the Invention

The present invention is directed to electrically conductive and electromagnetic radiation absorptive coating compositions and the like.

2. Brief Description of the Prior Art

A variety of coating compositions are known which have electrically conductive or electromagnetic radiation absorptive properties or the like. The solvent for many of the coating compositions has been primarily a volatile organic compound (VOC). A VOC-based binder system has several drawbacks. It may be toxic, flammable, and possibly explosive. The VOC raw material is costly to purchase and the waste is expensive to discard. Generally, VOC solvent emitted from coating operations is an environmental air pollutant. Expensive equipment and procedures are required to capture and contain VOC solvent emissions in order to reduce air pollution and enable proper waste disposal.

Coating compositions are also known which use electrically conductive or electromagnetic radiation absorptive microspheres. However, these coating compositions have been limited by the binder systems employed.

Finally, coating compositions are known which use a plurality of electrically conductive particles. However, these coating compositions have also been limited by the binder systems employed.

Accordingly, it is an object of the present invention to provide an aqueous based coating composition having electrically conductive or electromagnetic radiation absorptive properties or the like.

It is a further object of the present invention to provide a coating composition which is electrically conductive or electromagnetic absorptive or the like having an improved binder system.

It is another object of the present invention to provide an aqueous based coating composition having electrically conductive and electromagnetic radiation absorptive properties particularly useful for coating plastic surfaces, fiber reinforced plastics, flexible plastic objects and other flexible materials as well as metal surfaces and the like.

These and other objects of the invention will become more apparent upon reading the following description of the invention.

SUMMARY OF THE INVENTION

The present invention is directed to an electrically conductive and/or electromagnetic radiation absorptive coating composition or the like having a water emulsion polymer binder. The binder is a blend of a first emulsion containing a conjugated diene monomer or comonomer, and a second emulsion containing an acrylic, aliphatic or aromatic polyurethane, polyester urethane, polyester, epoxy, polyamide, polyimide, vinyl, modified acrylic, fluoropolymer or silicone polymer, or any combination of two or more of these polymer systems.

The first emulsion preferably includes an ethylenically unsaturated comonomer which is typically an unsaturated nitrile such as acrylonitrile, a monovinyl aromatic hydrocarbon such as styrene, or vinylpyridine. The first emulsion is preferably a substantially saturated carboxylated or non-carboxylated butadiene-acrylonitrile latex. The carboxylated butadiene-acrylonitrile latex preferably contains unreacted salts. The second emulsion is an acrylic, aliphatic or aromatic polyurethane, polyester urethane, polyester, epoxy, polyamide, polyimide, vinyl, modified acrylic, fluoropolymers or silicone polymer.

The coating composition also contains an effective amount of electrically conductive particles and electromagnetic radiation absorptive particles dispersed in the binder. These particles include a synergistic combination of carbon particles and metal containing particles. These particles should have a mean particle size preferably less than about 100 microns, and most preferably about 45 microns, so that they will easily disperse in the binder.

The preferred carbon particles are graphite particles and carbon nanotubes. The graphite particles are preferably natural flake graphite. The carbon nanotubes are preferably about 10 to about 60 nanometers in diameter and from less than 1 micron to about 40 microns in length. The metal containing particles are preferably silver or nickel containing particles. The silver or nickel containing particles are more preferably silver or nickel coated ceramic microspheres or silver or nickel coated ceramic fiber particles which are lightweight and have electromagnetic radiation absorptive properties.

The coating composition also contains water. The water is present in an effective amount.

The present invention further relates to a coated substrate. The substrate is typically paper, cloth, plastics such as polycarbonate, acrylic, nylon, polyester, rubber, steel, composite materials or fiber reinforced plastics, such as fiberglass and the like. The substrate may be a plastic component of an electronic device. The substrate may also be a pipe, a rubber mat, or the like or even a room, building, temporary facility, or a vehicle such as an aircraft, tank or ship.

DESCRIPTION OF THE PREFERRED EMBODIMENTS

Although several preferred compositions of the present invention are disclosed, it is to be understood that the exact compositions are given by way of illustration only. It is not intended that the invention be limited in its scope to the exact compositions set forth in the following description. Also, in describing preferred compositions, specific terminology will be resorted to for the sake of clarity. It is to be understood that each specific term includes all technical equivalents.

The first emulsion of the coating composition includes polymers composed of 5 to 100% by weight of a conjugated diene monomer unit and 95 to 0% by weight of an ethylenically unsaturated monomer unit. Specific examples of the conjugated diene monomer are 1,3-butadiene, 2,3-dimethylbutadiene, isoprene and 1,3-pentadiene. Specific examples of the ethylenically unsaturated monomer include unsaturated nitrites such as acrylonitrile and methacrylonitrile, monovinyl aromatic hydrocarbons such as styrene and alkylstyrenes, divinyl aromatic hydrocarbons such as divinylbenzene, dialkenyl aromatics such as diisopropenylbenzene, unsaturated carboxylic acids and the esters thereof such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate. The polymer may be one hydrogenated by the method described in U.S. Pat. No. 4,452,950, the disclosure of which is expressly incorporated herein by reference.

Specific examples of polymers include nitrile butadiene, styrene butadiene, butadiene reacted with vinyl pyridine, polybutadiene, carboxylated nitrile butadiene and carboxylated styrene butadiene. A preferred polymer is a highly saturated butadiene/acrylonitrile copolymer latex available from the Goodyear Tire and Rubber Company, Akron, Ohio (Goodyear) as Chemisat LCH-7302X latex. Another preferred polymer is a highly saturated carboxylated butadiene/acrylonitrile latex available from Goodyear as Chemisat LCH-7505X latex. The carboxylated commercial product contains unreacted salts which are believed to be particularly beneficial to the present invention.

The second emulsion is an acrylic, aliphatic or aromatic polyurethane, polyester urethane, polyester, epoxy, polyamide, polyimide, vinyl, modified acrylic, fluoropolymers, or silicone polymer. Suitable acrylic emulsions are available from Rohm and Haas Company, Philadelphia, Pa., as Rhoplex WL-96 waterborne acrylic polymer and Maincote HG-54D waterborne acrylic resin. Aliphatic and aromatic urethanes are polyisocyanate based on hexamethylene diisocyanate or isophorone diisocyanate or diphenylmethane diisocyanate. Polyester urethane is an anionic dispersion of an aliphatic polyester urethane polymer. Polyester is an emulsified polyester polymer or an emulsified unsaturated polyester. Epoxy can be an epoxy, epoxy cresol novolac or epoxy phenol novolac. Modified acrylic can be a polyester acrylate, acrylic/styrene copolymer, n-butylacrylate/acrylonitrile copolymer, acrylic/melamine, or acrylic/urea-formaldehyde. Fluoropolymer can be a polytetrafluoroethylene dispersion. Silicone can be alkyalkoxysiloxane, alkyethoxysilane or polydimethylsiloxane.

The blending of the second polymer emulsion with the first polymer emulsion results in several desirable properties and improvements in the characteristics of the first emulsion. The second emulsion enhances the chemical resistance of the first emulsion, improves its hardness while retaining its flexibility, enhances its adhesion properties to create a stronger bond with a substrate, and results in better flow properties. The use of the second emulsion may also improve the exterior durability of the first emulsion as well as its abrasion resistance. In cases where an epoxy, urethane, fluoropolymer, or silicone polymers are used, an increased level of performance is found for areas of adverse conditions such as sea water environments, harsh chemical environments and areas of high wear and corrosion.

The graphite particles are preferably natural flake graphite. Suitable natural flake graphite particles are available from the Ashbury Graphite Mills, Inc., Ashbury, N.J., having a particle size of about 97% or greater passing 325 mesh U.S. Standard Sieve, i.e. less than 44 microns. These particles contain about 95% or greater carbon. The particles are available under the grade numbers 146, Micron 750 and Micron 790.

The carbon nanotube particles can be a carbon nanotube with a single wall or a multi-wall structure. They may be a hollow structure or a bamboo structure. The diameter of the carbon nanotubes can range from about 10 to about 60 nanometers. The length of the carbon nanotubes can range from less than 1 micron to about 40 microns.

The metal containing particles are preferably silver or nickel containing particles; however, other metals may also be employed such as gold, platinum, copper, aluminum, iron or iron compounds and palladium. The metal containing particles are preferably metal coated ceramic microspheres or metal coated ceramic fibers; however, other metal coated particles may also be employed such as metal coated glass flakes, glass spheres, glass fibers, boron nitride powder or flake and mica flakes. Metal coated microspheres are particularly adaptable for the present invention because they are lightweight, thus reducing the overall weight and density of the coating composition, and do not detract from the coating capability of the composition.

As disclosed in U.S. Pat. Nos. 4,624,798 and 4,624,865, the disclosures of which are expressly incorporated herein by reference, electrically nonconductive magnetic lightweight microballoons or microspheres may be coated with an extremely thin layer of metal to produce a material which can be incorporated into electrically nonconductive materials to give composites with superior electrical conductivity. These composites have a very low density, often lower than the electrically nonconductive plastic. Additionally, the desirable mechanical properties of the composite are only slightly affected by the inclusion of metal coated magnetic microballoons. As known to those skilled in the art, the terms microspheres and microballoons are interchangeable and connote the same product and technology.

As further disclosed in the '798 and '865 patents, certain grades of commercially available ceramic microballoons have inherent magnetic properties. The magnetic properties are attributable to the presence in the ceramic composition of magnetic components such as iron, nickel, iron oxide, ferrite or mixtures of these materials. This magnetic property enhances the tendency of the metal coated microballoons to form networks, and gives composites with exceptional electrical conductivity.

The '798 and '865 patents disclose the use of commercially available ceramic microballoons which are lightweight, strong microspheres formed of a ceramic composition composed primarily of aluminum silicates, magnesium silicates, sodium silicates, or mixtures of these materials. The microspheres are hollow, have a porous ceramic shell, and are considerably stronger and more abrasion resistant than siliceous (glass) hollow microspheres. More particularly, these ceramic microspheres, which are referred to as centospheres, are derived from the ash from industrial furnaces which burn powdered coal, and certain grades of them are magnetic as a consequence of the coal containing magnetic impurities such as iron, ferrite, nickel, ferric oxide and magnetite. Since they are a byproduct of coal-fired furnaces, they are considerably less expensive than commercially manufactured microballoons.

According to the '798 and '865 patents, noble metals such as silver, gold, platinum, and palladium give the best results, having a negligible tendency to oxidize at the contact points. By providing a thin coating of the noble metal on the surface of an inexpensive and lightweight magnetic microballoon, it is said to be possible to achieve the desirable electrical properties of the metal. The microballoons are preferably coated with silver.

According to U.S. Pat. No. 5,786,785, the disclosure of which is expressly incorporated herein by reference, metal coated microspheres of the type described in U.S. Pat. Nos. 4,624,798 and 4,624,865 can be used to form strong, very lightweight coatings and composites which absorb electromagnetic radiation. The microspheres have a diameter of from 1 to 350 microns, and the microballoons contain at least one radiation absorbing material selected from the group consisting of carbon, ferrites, magnetite, iron, nickel and cobalt and have a thin coating of metal on the microsphere surface. Preferably, the '785 patent states the microspheres comprise ceramic magnetic microspheres derived from the ash from coal fired furnaces, and these microspheres possess permanent magnetic properties.

According to the '785 patent, the microspheres are coated with a thin coating of an electrically conductive metal on the microsphere surface, the metal coating being present in a percentage by weight of 0.01 to 22 percent. While any conductive metal may be used, silver, nickel, gold, platinum, palladium and their alloys are preferred. The microspheres are plated with the metal using the procedures described in U.S. Pat. Nos. 4,624,798 and 4,624,865.

For best results, the '785 patent states the coating should be electrically isolated from an electrically conductive substrate by a coating of insulator material applied as a primer. The thickness of the primer and its electrical properties become less important as the thickness of the absorptive layer increases. The absorptive layer may be top coated to give a very tough and smooth final surface with any conventional coating which is radar transparent.

Microspheres of the type described above for the present invention are commercially available from Spectro Dynamic Systems, Hickory, N.C. These microspheres include silver coated cenospheres having particle sizes of 5 to 75 microns in diameter with a mean particle size of about 45 microns, and typical silver thickness of 500 angstroms.

Without intending to be limiting, it is believed that the combination of graphite particles or carbon nanotubes together with the metal containing particles, as described above, produce a synergistic effect in raising the overall level of electrical conductivity and electromagnetic radiation absorption capabilities of the resultant coating composition. This combination also avoids certain detrimental characteristics found in the prior art.

In materials utilizing graphite as a conductive component, the amount of graphite required to produce adequate conductivity may result in an undesirable decrease in film-forming properties. Also, metal particles are very dense compared to the typical polymer used as a binder and tend to settle out and separate from the binder. By using a combination of graphite and metal containing lightweight particles, such as metal coated microspheres, a sufficient amount of binder may be used to provide the desirable film-forming properties (e.g., adhesion, film integrity, flexibility, durability) while obtaining improved conductivity. When graphite particles or carbon nanotubes are used in combination with metal coated lightweight particles, it is also believed that the graphite particles or carbon nanotubes fill in the gaps between the metal coated particles to provide improved electrical conductivity properties. It has further been found that the carbon nanotubes alone appear to produce significant conductivity without detrimental effects to the film formation of the coating.

The polymer blend also includes water. The water is present in an effective amount.

The coating composition will typically contain about 2.0% to about 30.0% by weight of the first emulsion, preferably about 5.0% to about 20.0% by weight. The coating composition will typically contain about 15.0% to about 60.0% by weight of the second emulsion, preferably about 25.0% to about 50.0% by weight. The coating composition will typically contain about 2.0% to about 20.0% by weight of the graphite particles, preferably about 5.0% to about 15.0% by weight. When carbon nanotubes are used as the carbon ingredient, the carbon nanotube content is about 0.1% to about 15.0% by weight, preferably about 0.5% to about 8.0% by weight.

The coating composition will typically contain about 5.0% to about 55.0% by weight of the metal containing particles, preferably about 15.0% to about 40.0% by weight. The coating composition will also typically contain, in addition to any water which is present in the binder system, about 5.0% to about 25.0% by weight of water, preferably about 10.0% to about 20.0% by weight. The coating composition may also include various additives such as tetrafluoroethylene fluorocarbon additives, thickening agents, dispersants, coalescing solvents and anti-foaming agents, in amounts conventionally employed in these types of compositions.

The binder system described herein which includes a blend of the first and second emulsions may be used as a primer or top coat for the coating composition of the present invention. Alternatively, conventional primers and topcoats may be employed in combination with the coating composition of the present invention depending upon the desired use of the product. For example, an acrylic latex may be used as a top coat for the coating composition of the present invention.

The present invention provides an excellent coating for paper and other similar substrates. It offers excellent resistance to heat, solvent, petroleum products, weathering, ozone, ultraviolet light, oxygen and fluid while being aqueous based. It requires no solvents, expensive catalysts or special equipment for application or curing. Its heat aging is superior to conventional nitrile butadiene rubber and can be formulated in dip systems or beater additions. It also has good low temperature flexibility and excellent flex fatigue resistance. This product has a low VOC content and is non-flammable. It has an excellent dry time of about 20 to 40 minutes tack free and can be force-dried.

The coating composition of the present invention can also be coated on a variety of substrates, in addition to paper. The other substrates include cloth, plastics such as polycarbonate, acrylic, nylon and polyester, rubber, steel and other metal substrates, composite structures, fiber reinforced plastics and fibers such as aramid and glass.

The application of the coatings to substrates is simple and straightforward. The coating compositions can be brush, spray or roller applied as well as roll coated. In addition, the substrates can be coated by dip application. In dip applications, several dipping operations may be required to achieve the necessary film thickness (e.g., 2-10 mils). After each dip application, forced air drying is recommended. In order to perform as a coating composition, the coating formulations according to the present invention have a viscosity ranging between about 10 to about 2800 centipoise. Preferably, the viscosity of the coating composition of the present invention ranges between about 200 to about 2200 centipoise.

Further, the coating composition of the present invention cures at temperatures consistent with ambient conditions and within a reasonable time frame so as to facilitate its application and use as a coating composition. More specifically, the composition of the present invention cures at temperatures between about 50° F. and about 120° F., and preferably between about 60° F. and about 100° F. The cure time ranges between about 10 minutes and about 6 hours, and preferably between about 30 minutes and about 3 hours.

The % nonvolatile component of the coating composition of the present invention should range between about 30 and about 60.0 (by weight) and about 25.0 to about 65.0 (by volume), preferably ranging between about 35 to about 50.0

(by weight) and 30.0 to about 55.0 (by volume). Other specifications of the coating composition of the present invention are typically:

| | |
|---|---|
| Wgt. per gal: | 7.5-9.0 |
| % Wgt. solids: | 30.0-60.0 |
| % vol. solids: | 25.0-65.0 |
| pH: | 8.0-9.8 |

The composition of the present invention also can be used for the coating of paper by beater addition to strengthen and fortify the paper fiber to make it chemically resistant. This method can produce coatings to protect gaskets and paper from the effects of transmission fluids, gasolines, oil, and heat to temperatures of 350° F. A beater is a special machine used to open and disperse by mechanical action the fiber bundles in a dilute slurry of pulp. The dispersed fibers are then shortened and fibrillated by continuing the action of the beater before adding the coating material of the present invention. Once added to the beater or to a downstream mixing tank, the coating material is precipitated under controlled conditions by reaction with alum or cationic agents such as water soluble polyamides or polyamines. Dilute aqueous aluminum sulfate solutions are used to completely precipitate the coating material from the highly diluted slurry onto the fiber and fillers. Once the latex precipitation is complete, the stock or "furnish", as it may be called, is fed to a machine chest and into the paper machine. Once this process is completed, the paper fibers are further coated with the coating of the present invention.

The coatings of the present invention have tremendous adhesion properties and performance to a variety of substrates. The coatings have unique conductive and shielding properties. For example, a paper circuit board coated with this water-based system can effectively conduct electricity and shield electronic devices from stray electrical currents. The coatings can also be used as water-based decontaminable coatings for military applications. The coatings also have high military value in stealth technology for reducing the radar cross section of ships, planes, etc.

The chemistry of the present invention is based on a combination of acrylic, aliphatic or aromatic polyurethane, polyester urethane, polyester, epoxy, polyamide, polyimide, vinyl, modified acrylic, fluoropolymer and silicone emulsion resins in combination with water-based conjugated diene monomer or comonomer rubber resins which has created a unique combination of chemical resistance and adhesion properties. The incorporation of conductive particles has enhanced the electrical properties. Also, one of the resins has about 6% unreacted conductive salts that adds to its conductive properties.

Illustrative end uses include the following:

1) electrical conductive and shielded paper;

2) chemical warfare resistant coatings for paper, plastic, cloth, steel, fiberglass, etc.;

3) electromagnetic shielding of plastics components for computers, electronic devices from stray radio waves and electrical impulses:

4) coated plastic substrates such as pipe and other plastic articles to dissipate electrical charges built up during transferring of flammable liquids or in explosive environments;

5) electromagnetic shielding for rubber substrates with water-based coatings;

6) water-based shielded electrical coating systems with chemically decontaminable water-based systems for bacteriological warfare;

7) use of the above coating systems to provide stealth characteristics for military applications for tanks, planes, vehicles, ships, etc.;

8) use of the above coating systems on radomes, antennae, computers, etc. for shielding, static electrical dissipation and to produce a ground plane; and 9) application to rubber mats for grounding of electrical devices and computers.

10) application to surfaces of a room, such as the walls, ceiling and/or floor, for eavesdropping prevention.

11) application to surfaces of a room, such as the walls, ceiling and/or floors to shield against electromagnetic interference and electromagnetic pulse.

The following examples illustrate coating compositions in accordance with the present invention which have electrically conductive and electromagnetic radiation absorptive properties using graphite and silver coated ceramic microspheres.

EXAMPLE 1

| Composition Component | Weight in parts per 100/Wt. |
|---|---|
| Acrylic Resin #1 | 37.5 |
| XHNBR Latex #1 | 5.5 |
| Water | 12.5 |
| Ethylene Glycol Monobutyl Ether | 5.0 |
| Defoamer #1 | 1.0 |
| Surfactant | 1.0 |
| Conductive Spheres | 35.0 |
| Graphite | 2.5 |

The Acrylic Resin #1 was placed in a suitable vessel for mixing and slow speed agitation was begun. The XHNBR Latex #1 was added at a slow rate and allowed to mix with the Acrylic Resin for 5 minutes. Water and glycol ether were premixed in a separate container and added slowly to the vessel containing the resins under agitation. The defoamer and surfactant were then added and allowed to mix for 15 minutes under mild agitation. Next, the conductive spheres were slowly added with continued mild agitation, while allowing the spheres to wet out completely. The graphite was then added slowly under mild agitation, and the entire mixture continued to mix for 20 minutes under mild agitation. The coating formulation of Example 1 is particularly useful for coating on plastic surfaces and exhibited the following properties:

| | |
|---|---|
| Flexibility | Pass ¼" Mandrel Bend Test according to ASTM D522 |
| Conductivity | 1.5 ohms per square |
| Impact resistance | Pass 160 in/lb direct and 160 in/lb reverse impact test according to ASTM D2794 |
| Viscosity | 38 seconds using a #2 Zahn Cup according to ASTM D4212 |

EXAMPLE 2

| Composition Component | Weight in parts per 100/Wt. |
|---|---|
| Acrylic Resin #1 | 35.0 |
| XHNBR Latex #1 | 8.0 |
| Water | 12.5 |
| Ethylene Glycol Monobutyl Ether | 5.0 |
| Defoamer #1 | 1.0 |
| Surfactant | 1.0 |
| Conductive Spheres | 30.0 |
| Graphite | 7.5 |

The composition of Example 2 was formulated in the same procedure as described above in connection with Example 1. This composition is particularly useful for flexible plastics and exhibited the following properties:

| | |
|---|---|
| Flexibility | Pass ¼" Mandrel Bend Test according to ASTM D522 |
| Conductivity | 2.2 ohms per square |
| Impact resistance | Pass 160 in/lb direct and 160 in/lb reverse impact test according to ASTM D2794 |
| Viscosity | 40 seconds using a #2 Zahn Cup according to ASTM D4212 |

EXAMPLE 3

| Composition Component | Weight in parts per 100/Wt. |
|---|---|
| Acrylic Resin #1 | 31.0 |
| XHNBR Latex #1 | 11.0 |
| Water | 12.5 |
| Ethylene Glycol Monobutyl Ether | 5.0 |
| Defoamer #1 | 1.0 |
| Surfactant | 1.0 |
| Conductive Spheres | 32.0 |
| Graphite | 5.5 |

The composition of Example 3 was formulated in the same procedure as described above in connection with Example 1. This composition is particularly useful for flexible materials such as paper and textiles and exhibited the following properties:

| | |
|---|---|
| Flexibility | Pass ⅛" Mandrel Bend Test according to ASTM D522 |
| Conductivity | 1.7 ohms per square |
| Impact resistance | Pass 160 in/lb direct and 160 in/lb reverse impact test according to ASTM D2794 |
| Viscosity | 38 seconds using a #2 Zahn Cup according to ASTM D4212 |

EXAMPLE 4

| Composition Component | Weight in parts per 100/Wt. |
|---|---|
| Acrylic Resin #2 | 38.0 |
| XHNBR Latex #1 | 7.5 |
| Water | 9.0 |
| Diethylene Glycol Monobutyl Ether | 5.0 |
| Defoamer #2 | 1.0 |
| Surfactant | 1.0 |
| Conductive Spheres | 30.0 |
| Graphite | 7.5 |

The composition of Example 4 was formulated in the same procedure as described above in connection with Example 1 except that Acrylic Resin #2 and Defoamer #2 were substituted for Acrylic Resin #1 and Defoamer #1, respectively. This composition is particularly useful for metal surfaces and exhibited the following properties:

| | |
|---|---|
| Flexibility | Pass ¼" Mandrel Bend Test according to ASTM D522 |
| Conductivity | 2.2 ohms per square |
| Impact resistance | Pass 160 in/lb direct and 160 in/lb reverse impact text according to ASTM D2794 |
| Viscosity | 38 seconds using a #2 Zahn Cup according to ASTM D4212 |

EXAMPLE 5

| Composition Component | Weight in parts per 100/Wt. |
|---|---|
| Acrylic Resin #2 | 35.0 |
| XHNBR Latex #1 | 10.5 |
| Water | 10.0 |
| Diethylene Glycol Monobutyl Ether | 5.0 |
| Defoamer #2 | 1.0 |
| Surfactant | 1.0 |
| Conductive Spheres | 35.0 |
| Graphite | 2.5 |

The composition of Example 5 was formulated in the same procedure as described above in connection with Example 4. This composition is particularly useful for flexible plastic and composite structures and exhibited the following properties:

| | |
|---|---|
| Flexibility | Pass ⅛" Mandrel Bend Test according to ASTM D522 |
| Conductivity | 1.5 ohms per square |
| Impact resistance | Pass 160 in/lb direct and 160 in/lb reverse impact test according to ASTM D2794 |
| Viscosity | 34 seconds using a #2 Zahn Cup according to ASTM D4212 |

EXAMPLE 6

| Composition Component | Weight in parts per 100/Wt. |
|---|---|
| Acrylic Resin #1 | 35.0 |
| XHNBR Latex #2 | 8.0 |
| Water | 12.5 |

| Composition Component | Weight in parts per 100/Wt. |
|---|---|
| Ethylene Glycol Monobutyl Ether | 5.0 |
| Defoamer #1 | 1.0 |
| Surfactant | 1.0 |
| Conductive Spheres | 30.0 |
| Graphite | 7.5 |

The composition of Example 6 was formulated in the same procedures as described above in connection with Example 1, except XHNBR Latex #2 was substituted for XHNBR Latex #1. This composition is particularly useful for plastics and composites and exhibited the following properties:

| | |
|---|---|
| Flexibility | Pass ¼" Mandrel Bend Test according to ASTM D522 |
| Conductivity | 2.2 ohms per square |
| Impact resistance | Pass 160 in/lb direct and 160 in/lb reverse impact test according to ASTM D2794 |
| Viscosity | 36 seconds using a #2 Zahn Cup according to ASTM D4212 |

The following is a list of sources for the various compositions used in the above six examples.
1) Acrylic Resin #1 was "Rhoplex WL-96," which is a waterborne acrylic polymer available from Rohm & Haas Co., Philadelphia, Pa.
2) Acrylic Resin #2 was "Maincote HG-54D," which is a waterborne acrylic resin available from Rohm & Haas Co., Philadelphia, Pa.
3) XHNBR Latex #1 was "Chemisat LCH-7302X," which is a highly saturated butadiene/acrylonitrile copolymer latex available from the Goodyear Tire & Rubber Co., Akron, Ohio.
4) XHNBR Latex #2 was "Chemisat LCH-7505X," which is a highly saturated carboxylated butadiene/acrylonitrile copolymer latex available from the Goodyear Tire & Rubber Co., Akron, Ohio.
5) Defoamer #1 was "Patcote 519," which is a defoamer available from Patco Chemicals, Kansas City, Mo.
6) Defoamer #2 was "BYK 024," a defoamer available from BYK Chemie USA, 524 South Cherry Street, Wallingford, Conn. 06492.
7) The surfactant was "Triton CF-10," a surfactant available from Union Carbide Co., 39 Old Ridgebury Road, Danbury, Conn. 06817.
8) The "conductive spheres" were silver coated microspheres available from Spectro Dynamics Systems, Hickory, N.C.
9) The graphite component was Natural Flake available from Ashbury Graphite Mills, Ashbury, N.J.

A preliminary evaluation was made of a coating of the present invention similar to Example 1 as a flex-circuit impedance matching coating. The impedance versus frequency of the coated tape varied between about 25 and 40. All of the data was for both sides coated, one central signal run between two shield runs, but neither coating shorted to the shields. The ideal transmission line will have a broad band of constant impedance (generally at 50 or 75 ohms) versus frequency. Against this criterion, the coating of the present invention was comparable to other impedance matching coatings. Some of the impedance variation may have been due to the inconsistent thickness of the coating on the test sample. The coating varied from 0.0045" to 0.0145" thick with an average thickness of 0.0063". Improved application methods, such as spray or screen printing, will enable improved thickness control. The coating represents a much higher resistance coating than other coatings previously evaluated. The volume resistivity is approximately 2800 milliohm-cm, compared to 1.2 milliohm-cm of another coating and 0.2 milliohm-cm of yet another coating. Since the impedance reduction is comparable for these coatings of vastly different conductivity, it appears that the impedance depression effect is not highly sensitive to coating resistance, at least in the range of several hundred ohms per inch.

While certain representative embodiments and details have been shown for the purpose of illustrating the invention, it will be apparent to those skilled in this art that various changes, modifications and variations may be made therein without departing from the scope of the invention. Accordingly, it is intended to embrace all such changes, modifications and variations that fall within the spirit and scope of the appended claims. All patent applications, patents and other publications cited herein are incorporated by reference in their entirety. All parts and percentages are by weight unless otherwise explicitly stated.

We claim:

1. A coating composition having electrically conductive and electromagnetic radiation absorptive properties, comprising: (1) a water emulsion polymer binder; (2) electrically conductive particles dispersed in the binder; and (3) water; said electrically conductive particles being a combination of uncoated carbon particles and metal coated particles selected from the group consisting of ceramic microspheres, ceramic fibers, glass flakes, glass spheres, glass fibers, boron nitride powder or flake and mica flakes; and said electrically conductive particles providing electrically conductive and electromagnetic radiation absorptive properties to said coating composition.

2. The coating composition of claim 1, wherein the carbon particles and metal coated particles have a mean particle size less than about 100 microns.

3. The coating composition of claim 2, wherein the carbon particles and metal coated particles have a mean particle size of about 45 microns.

4. The coating composition of claim 1, wherein the carbon particles are selected from the group consisting of graphite particles and carbon nanotubes.

5. The coating composition of claim 4, wherein the carbon particles are natural flake graphite.

6. The coating composition of claim 1, wherein the metal coating of the metal coated particles is selected from the group consisting of silver, nickel, gold, platinum, copper, aluminum, iron, iron compounds and palladium.

7. The coating composition of claim 6, wherein the metal coating is silver or nickel.

8. The coating composition of claim 7, wherein the particles are ceramic microspheres or ceramic fibers.

9. The coating composition of claim 1, wherein the carbon particles comprise about 2.0 to about 20.0% by weight of the total coating composition.

10. The coating composition of claim 1, wherein the metal coated particles comprise about 5.0 to about 55.0% by weight of the total coating composition.

11. The coating composition of claim 1, wherein the metal coated particles are microspheres coated with a metal selected from the group consisting of silver, nickel, gold, platinum, copper, aluminum, iron, iron compounds and palladium.

12. The coating composition of claim 11, wherein the carbon particles are graphite, carbon nanotubes or both and the metal coated particles are silver or nickel coated microspheres.

13. A coating composition having electrically conductive and electromagnetic radiation absorptive properties, which comprises by weight: (1) about 2.0% to about 30.0% of a butadiene water emulsion binder; (2) about 15.0% to about 60.0% of a second emulsion binder which enhances the chemical resistance and hardness of said butadiene water emulsion binder while retaining its flexibility; (3) about 0.5% to about 20.0% of carbon particles; (4) about 5.0% to about 55.0% of metal coated microspheres; and (5) about 5.0% to about 25.0% water.

14. The coating composition of claim 13, wherein each of the enumerated ingredients are present in the following percentages by weight: (1) about 5.0% to about 20.0%; (2) about 25.0% to about 50.0%; (3) about 0.5% to about 15.0%; (4) about 15.0% to about 40.0%; and (5) about 10.0% to about 20.0%.

15. The coating composition of claim 13, wherein the carbon component is carbon nanotubes in a weight percent of about 0.5% to about 5.0%.

16. A coated substrate, comprising a substrate and the coating composition of claim 1 coated thereon.

17. The coated substrate of claim 16, wherein the substrate is paper, cloth, plastic, rubber, metal or fiber reinforced plastics or composite structures.

18. The coated substrate of claim 17, wherein the plastic is a polycarbonate, acrylic or nylon plastic.

19. The coated substrate of claim 16, wherein the substrate is a plastic component of an electronic device.

20. The coated substrate of claim 16, wherein the substrate is a pipe.

21. The coated substrate of claim 16, wherein the metal containing particles are silver or nickel coated microspheres.

22. The coated substrate of claim 16, wherein the substrate is a vehicle, room or building.

23. The coated substrate of claim 16, wherein the substrate is paper and the substrate is coated by adding the coating composition by beater addition or coating the paper with the coating composition after the paper leaves the paper machine.

24. A method of electromagnetic shielding of an object which comprises applying a continuous coating to said object to be shielded, said coating including a water emulsion polymer binder, uncoated carbon particles and metallic coated ceramic microspheres or ceramic fibers sufficient to provide electrical conductivity and electromagnetic radiation absorption properties to said coating, and an effective amount of water, and allowing said coating to cure and dry to a hard coating surface.

25. The method of claim 24, wherein the coated object is paper, cloth, plastic, rubber, steel, composite material or pipe.

26. The method of claim 24, wherein the object is a room, building or other physical facility and the coating provides electrical and electromagnetic radiation absorption properties to the surface thereof.

27. The method of claim 24, wherein the object is a aircraft, tank, ship or other vehicle and the coating provides electrical and electromagnetic radiation absorption properties to the surface thereof.

* * * * *